R. MURPHY.
Churns.
No. 153,366. Patented July 21, 1874.
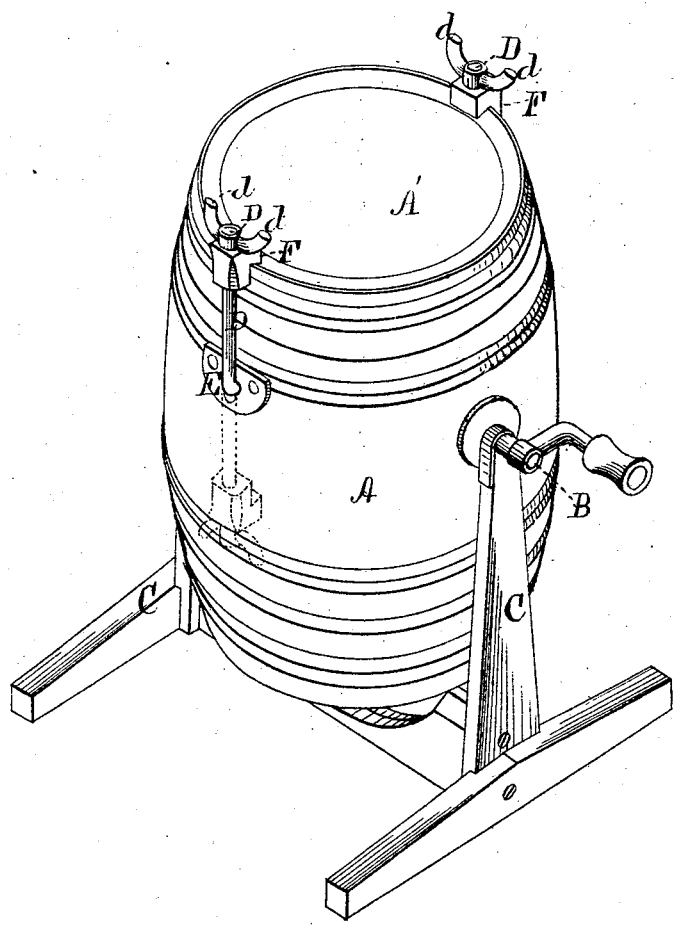
WITNESSES:
Jas. E. Hitchinson
John R. Young
INVENTOR
Robert Murphy, by
Prindle and Deane, his Attys

UNITED STATES PATENT OFFICE.

ROBERT MURPHY, OF CANISTEO, NEW YORK.

IMPROVEMENT IN CHURNS.

Specification forming part of Letters Patent No. 153,366, dated July 21, 1874; application filed June 9, 1874.

*To all whom it may concern:*

Be it known that I, ROBERT MURPHY, of Canisteo, in the county of Steuben and in the State of New York, have invented certain new and useful Improvements in Churns; and do hereby declare that the following is a full, clear, and exact description thereof, reference being had to the accompanying drawing making a part of this specification, in which is shown in perspective a churn containing my improvements.

My invention is an improvement upon a churn for which Letters Patent No. 86,999 were granted to me upon the 16th day of February, 1869, and its design is to facilitate the removal and replacement of the cover; to which end said invention consists in the means employed for connecting the cover to or with the churn, substantially as and for the purpose hereinafter specified.

In the annexed drawing, A represents a churn, which has the form of a cask, and is suspended centrally by means of trunnions B upon or from a suitable supporting-frame, C, so as to enable it to be rotated in a vertical plane having a line with its axis, said churn thus constructed being similar to that covered by the patent above named. The churn A is slightly overbalanced, so as to cause one of its ends to turn downward when unobstructed, and at its opposite upper end is provided a cover, A', that is made removable for the purpose of filling and emptying said churn, and to enable the interior to be cleansed. In order that the cover A' may be secured in place when desired, upon each side of the churn A is provided a bolt, D, which is swiveled or pivoted at one end within a suitable plate, E, attached to the side of said churn in such a manner as to enable the same to be turned upward alongside of said cover, as shown by the full lines, or when not in use to be dropped downward to the position shown by the dotted lines. The free end of each bolt D is provided with a screw-thread and a wing-nut, d, and just beneath the latter is placed a clamp, F, which may be caused to extend over and engage with the edge of the cover A, when, by screwing downward upon said nuts, said cover will be closely pressed against the churn and locked in place.

To remove the cover, the nuts d and d are loosened, the clamps withdrawn from engagement with the former, and the bolts permitted to drop downward to the position shown by the dotted lines.

Any required pressure may be applied to the cover, so that no difficulty need be experienced in securing a perfectly tight joint between the same and the churn.

The advantages obtained by my improvement are, first, the facility it affords for the removal of the churn-barrel and the substitution of another purified for use; second, the effective and expeditious means of removing or securing in place the cover of the revolving barrel; third, the expedition in the process obtained by the revolution of the barrel in the direction of its length.

Having thus fully set forth the nature and merits of my invention, what I claim as new is—

A churn-barrel mounted on a frame by means of trunnions proceeding from near its longitudinal center, and revolvable in the direction of its length, its removable end or cover held in place by pivoted arms and screw-clamps, as and for the purposes described and shown.

In testimony that I claim the foregoing I have hereunto set my hand this 8th day of June, 1874.

ROBERT MURPHY.

Witnesses:
GEO. S. PRINDLE,
WILLIAM FITCH.